US012646887B2

(12) United States Patent
Pritz et al.

(10) Patent No.: US 12,646,887 B2
(45) Date of Patent: Jun. 2, 2026

(54) CONNECTOR, MATING CONNECTOR, AND CONNECTOR SYSTEM

(71) Applicant: MD Elektronik GmbH, Waldkraiburg (DE)

(72) Inventors: Helmut Pritz, Ampfing (DE); Thomas Halbig, Dietfurt (DE); Benjamin Lang, Waldkraiburg (DE); Markus Kaaserer, Rott am Inn (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 335 days.

(21) Appl. No.: 18/512,474

(22) Filed: Nov. 17, 2023

(65) Prior Publication Data

US 2024/0186748 A1 Jun. 6, 2024

(30) Foreign Application Priority Data

Dec. 2, 2022 (DE) ..................... 10 2022 131 951.2

(51) Int. Cl.
*H01R 13/627* (2006.01)

(52) U.S. Cl.
CPC ................................ *H01R 13/6272* (2013.01)

(58) Field of Classification Search
CPC .. H01R 13/6272; H01R 13/639; H01R 13/42; H01R 13/516; H01R 13/635; H01R 13/646
See application file for complete search history.

(56) References Cited

U.S. PATENT DOCUMENTS

| | | | | |
|---|---|---|---|---|
| 6,010,348 | A * | 1/2000 | Alden | H01R 13/506 439/681 |
| 2013/0217277 | A1* | 8/2013 | Friese | H01R 13/4367 439/733.1 |
| 2014/0227898 | A1 | 8/2014 | Zhang | |
| 2018/0212360 | A1* | 7/2018 | Motohashi | H01R 13/6583 |
| 2019/0319389 | A1 | 10/2019 | Hara et al. | |
| 2022/0006235 | A1* | 1/2022 | Kirschner | H01R 13/639 |
| 2022/0173551 | A1* | 6/2022 | Pritz | H01R 13/65912 |
| 2022/0360017 | A1* | 11/2022 | Halbig | G02B 6/406 |

FOREIGN PATENT DOCUMENTS

| | | | |
|---|---|---|---|
| DE | 102020132011 | A1 | 6/2022 |

* cited by examiner

*Primary Examiner* — Abdullah A Riyami
*Assistant Examiner* — Nelson R. Burgos-Guntin
(74) *Attorney, Agent, or Firm* — LEYDIG, VOIT & MAYER, LTD.

(57) ABSTRACT

A connector incudes at least one inner conductor contact surrounded by an insulator along a mating direction, and an outer conductor contact surrounding the insulator along the mating direction. The outer conductor contact has at least one first plug securing means, so that the connector is securable to a corresponding mating connector via the outer conductor contact.

14 Claims, 9 Drawing Sheets

CONNECTOR, MATING CONNECTOR, AND CONNECTOR SYSTEM

CROSS REFERENCE TO RELATED APPLICATIONS

This application claims benefit to German Patent Application No. DE 10 2022 131 951.2, filed on Dec. 2, 2022, which is hereby incorporated by reference herein.

FIELD

The invention relates to a connector, a mating connector, and a connector system for transmitting high-frequency or radio-frequency signals.

BACKGROUND

The prior art has described pluggable connections where connectors are provided with latching springs on the housing to mechanically latch or connect two connectors (i.e., a connector and a corresponding mating connector) together. Existing latching arrangements of the prior art have high tolerances.

These high tolerances lead to the following issues: Firstly, they constitute discontinuities in radio-frequency (RF) pluggable connections. Secondly, these tolerances are caused and/or increased by mechanical movements. And finally, the pluggable connection receives forces at or via the housing elements, which often include plastic parts.

SUMMARY

In an embodiment, the present invention provides a connector including at least one inner conductor contact surrounded by an insulator along a mating direction, and an outer conductor contact surrounding the insulator along the mating direction. The outer conductor contact has at least one first plug securing means, so that the connector is securable to a corresponding mating connector via the outer conductor contact.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
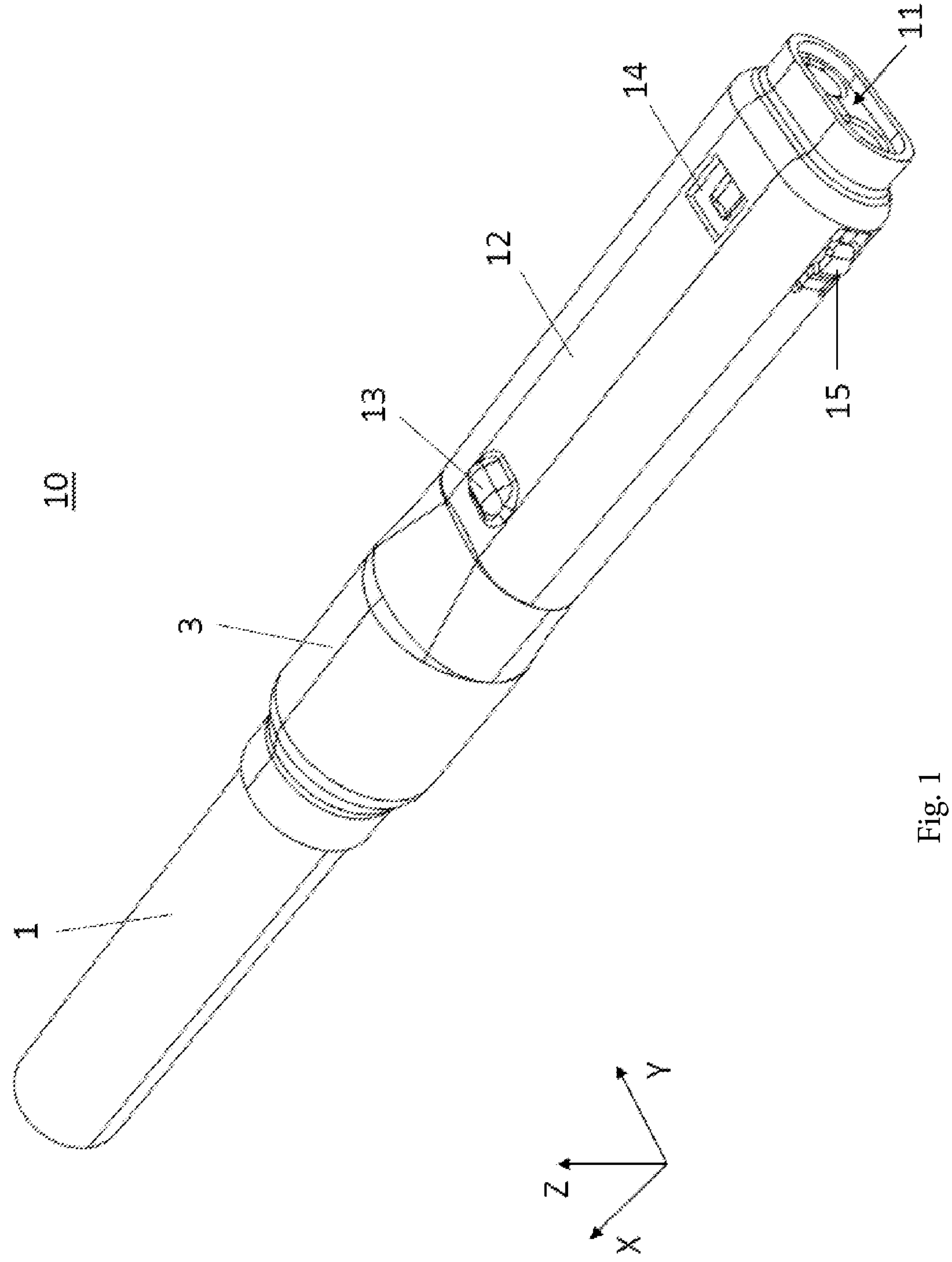
FIG. 1 shows a perspective view of an embodiment of a connector.

In an embodiment, the present invention provides a pluggable connection that reduces the above-mentioned tolerances and the forces at the housing elements and enables optimal transmission of RF signals.

In particular, a pluggable connection that reduces the above-mentioned tolerances and the forces at the housing elements and enables optimal transmission of RF signals is achieved by a connector according to an embodiment of the present invention having at least one inner conductor contact surrounded by an insulator along a mating direction, an outer conductor contact surrounding the insulator along the mating direction, the outer conductor contact having at least one first plug securing means, so that the connector is securable to a corresponding mating connector via the outer conductor contact.

The present connector is in particular securable only at the outer conductors between the connector and a corresponding mating connector. The attachment is so robust that it withstands the load tests required for pluggable connections, preferably in the automotive field. In particular, the present connector is securable to a corresponding mating connector via the outer conductor contact in such a manner that it resists pull-off. The present connector can be used in particular for pluggable connections for locking engagement between a PCB header and an in-line connector.

Due to the direct attachment, in particular locking engagement, of the outer conductors of the connector and an attached mating connector, the contact elements, which are mechanically connected to the respective wires, are directly secured or latched together. This makes it possible to ensure minimum tolerances, which enable an optimum RF design. In addition, mechanical pulling forces are applied directly via the connection to the cable. No housings are needed for securely coupling a connector and a corresponding mating connector. Therefore, unlike in the prior art, the housings are not subjected to loads. Overall, the present connector is designed such that the mounting steps provide for the smallest possible tolerances, because these refer to reference surfaces.

Preferably, the first plug securing means includes a recess into which can be interlockingly fitted a projection on the mating connector. The interlocking fit minimizes the tolerances.

Preferably, the recess is configured such that the attachment between the connector and the mating connector can be effective in the mating direction and in a direction opposite thereto. It is made more difficult for the connector to come loose in either of the two directions along the mating direction, which makes the connection more durable.

Preferably, the outer conductor contact has at least one second plug securing means by which the connector is securable to the mating connector. The second plug securing means increases the forces required to release the pluggable connection. This can hinder or even prevent the pluggable connection from being inadvertently released.

Preferably, the at least one second plug securing means includes a clamping element, so that the connector is securable to the mating connector by friction fit. A clamping element can be easily formed, in particular integrally with the outer conductor contact. The clamping element significantly increases the pull-off strength, which ensures a secure mated connection.

Preferably, the outer conductor contact includes at least one first inner securing means, the first inner securing means securing the outer conductor contact to the insulator by an interlocking fit. Due to the interlocking fit, very high forces are required to separate the outer conductor contact from the insulator. This precludes inadvertent separation. Moreover, the interlocking fit prevents the outer conductor contact and the insulator from being separated by relative movement thereof in either of the two directions along the mating direction. In addition, the interlocking fit positions the outer conductor accurately and with minimal tolerances relative to the insulator.

Preferably, the insulator includes at least a first and a second insulator element, the first and second insulator elements enclosing the at least one inner conductor contact, preferably completely, along the mating direction when in the assembled state. Because of the at least two insulator elements, the insulator can accommodate arbitrary, in particular arbitrarily shaped or arranged, inner conductors or inner conductor contacts, and completely surround them along the mating direction.

The first and second insulator elements preferably have recesses so that in the assembled state, the at least one inner conductor contact is disposed in the insulator with an interlocking fit. The shape of the recesses is matched to the inserted inner conductors and inner conductor contacts so that the tolerances are minimized. The whole chain of interlocking connections from the at least one inner conductor via the insulator to the outer conductor, and preferably further to the attached mating connector, minimizes the tolerances, thereby enabling an optimum RF design of the connector or of the pluggable connection with an attached mating connector.

Preferably, the first insulator element includes third inner securing means, and the second insulator element includes fourth inner securing means, the first and second insulator elements being releasably secured together via the third and fourth securing means. The releasable connection permits easy disassembly of the connector, which today can be a requirement to be met by a connector, in particular in the automotive field.

A pluggable connection that reduces the above-mentioned tolerances and the forces at the housing elements and enables optimal transmission of RF signals is also achieved, in particular, by a mating connector according to an embodiment of the present invention having at least one inner conductor contact surrounded by an insulator along a mating direction, an outer conductor contact surrounding the insulator along the mating direction, the outer conductor contact having at least one first plug securing means, so that the mating connector is securable to a corresponding connector via the outer conductor contact.

Preferably, the first plug securing means includes a projection that can be interlockingly fitted into a recess on the connector.

Preferably, the first plug securing means includes a tab for releasing the first plug securing means from attachment. "Attachment" means attachment of the mating connector to a connector. The tab allows the attachment to be easily released by hand or using a tool. Firstly, a secure mated connection is ensured and, secondly, a mated connection can be deliberately released, which permits disassembly of the mated connection.

A pluggable connection that reduces the above-mentioned tolerances and the forces at the housing elements and enables optimal transmission of RF signals is further achieved, in particular, by a connector system including a connector and a mating connector according to an embodiment of the present invention.

Preferred embodiments will be described in detail below with reference to the accompanying drawings.

Figure 3:
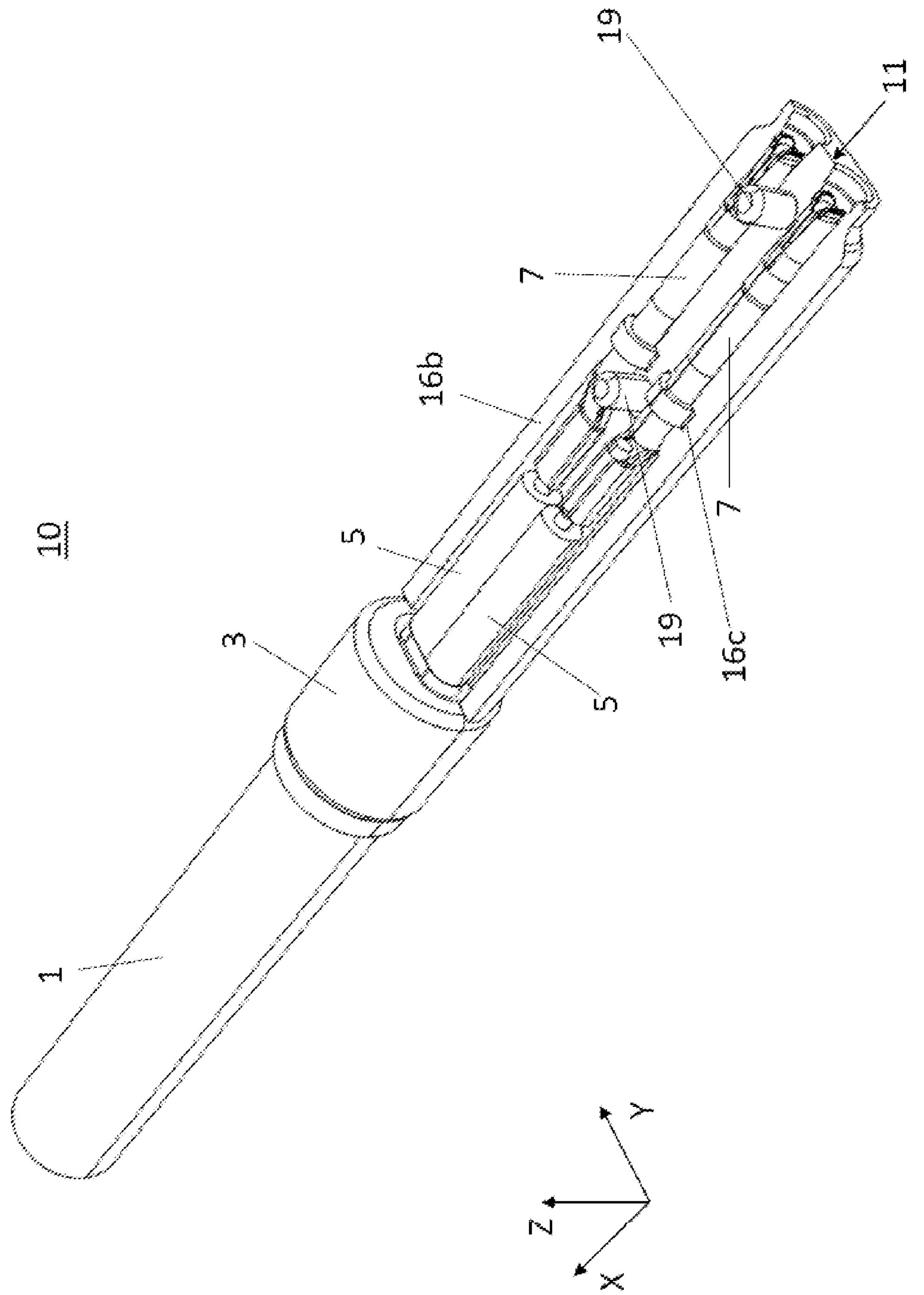
FIG. 3 shows the view of FIG. 2 without the first insulator element.

FIG. 1 shows an embodiment of a connector 10. Connector 10 is attached to a first cable 1 and adapted to transmit (RF) signals to a corresponding mating connector 20. The depicted first cable 1 has two inner conductors 5 as well as an outer conductor (see FIG. 3). In alternative embodiments, first cable 1 may have a different number of inner conductors 5. Inner conductors 5 of first cable 1 are connected to inner conductor contacts 7 within connector 10. In the mated state of connector 10 and mating connector 20, inner conductor contacts 7 of connector 10 are connected to corresponding inner conductor contacts 8 of mating connector 20 and can transmit (RF) signals and/or power. The outer conductor of first cable 1 is connected via a first outer conductor sleeve 3 to outer conductor contact 12 of connector 10. Outer conductor sleeve 3 is preferably connected by crimping to outer conductor contact 12 and to the outer conductor of first cable 1.

Figure 2:
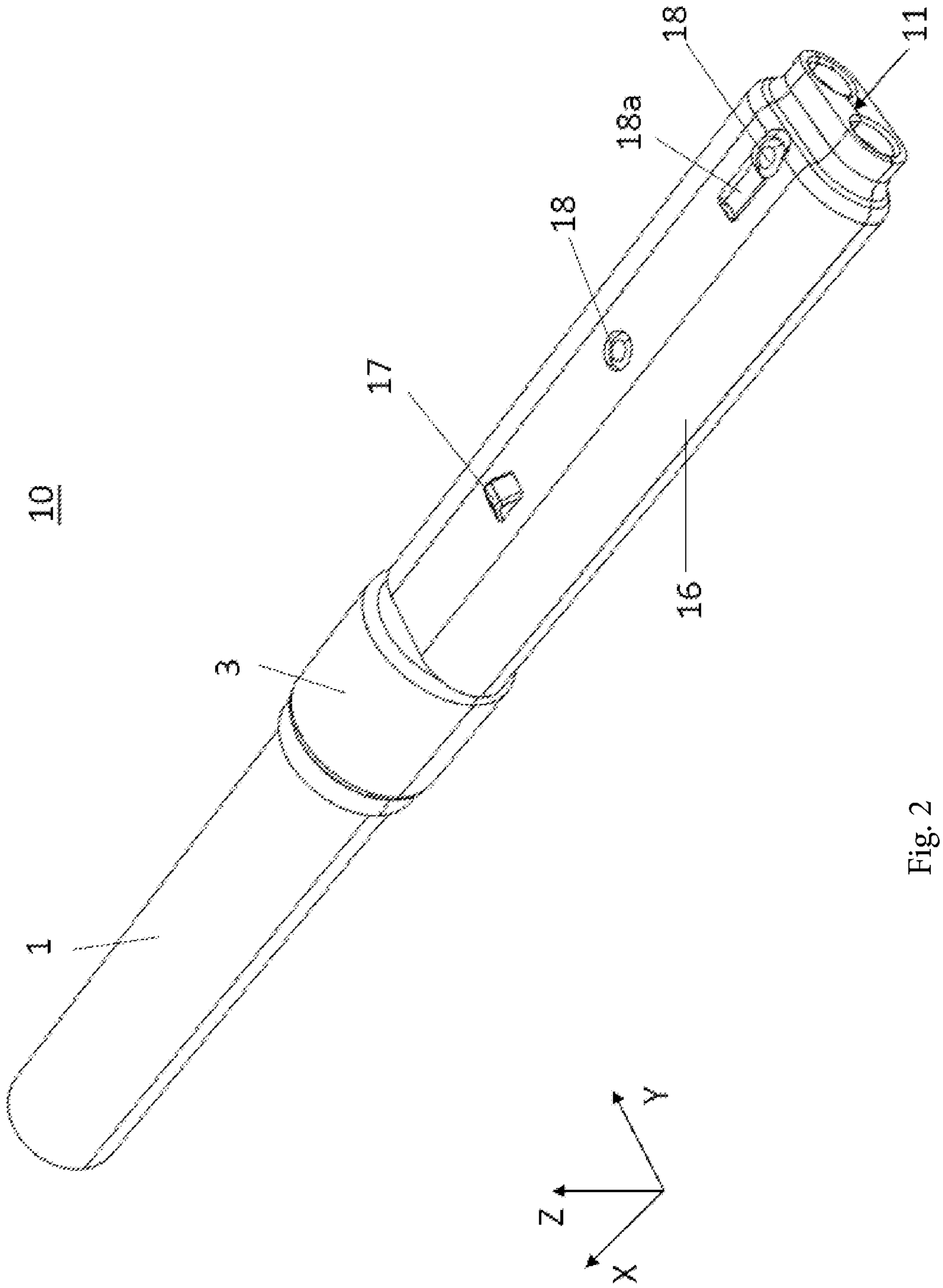
FIG. 2 shows the view of FIG. 1 without the outer conductor.

FIG. 2 shows the illustrated embodiment of connector 10 without outer conductor contact 12, with insulator 16 being visible. When assembling connector 10, outer conductor contact 12 can be slid over insulator 16 in mating direction X. In the process, second inner securing means 17 on insulator 16, which, in the illustrated embodiment, are shown as projections, engage into first inner securing means 13 on outer conductor contact 12. Outer conductor contact 12 and insulator 16 can be secured together by latching the first and second inner securing means 13, 17 together. Insulator 16 is preferably made from a plastic material. In particular, insulator 16 is made up of a first and a second insulator element 16*a*, 16*b*. In alternative embodiments, insulator 16 may also be made up of more than two insulator elements. In the illustrated embodiment, first and second insulator elements 16*a*, 16*b* are each formed as a half-shell. The two insulator elements 16*a*, 16*b* can be connected or secured together via third inner securing means 18 on the first insulator element and fourth inner securing means 19 on second insulator element 16*b*. In the illustrated embodiment, third inner securing means 18 are formed as openings, and fourth inner securing means 19 are formed as projections. In alternative embodiments, other forms of latching arrangements, such as latching hooks and recesses, or locking arrangements, such as tabs and projections, may also be used.

In the embodiments shown, each insulator element 16*a*, 16*b* has recesses 16*c* (see FIG. 3) that are configured such that the two inner conductor contacts 5 shown are received and secured by an interlocking fit in the assembled insulator 16. Recesses 16*c* are configured to match the number and shape of inner conductors 5 of first cable 1 and the number and shape of inner conductor contacts 7. Preferably, insulator 16 is manufactured in an injection-molding or a 3D printing process, so that recesses 16*c* can be flexibly designed.

The illustrated connector 10 and mating connector 20 (see FIG. 4) have no housing, as it is not needed for securing connector 10 to mating connector 20. A housing may be, preferably mechanically, attached to connector 10 and/or to mating connector 20, for example, to protect the respective outer conductors 12, 22.

Figure 4:
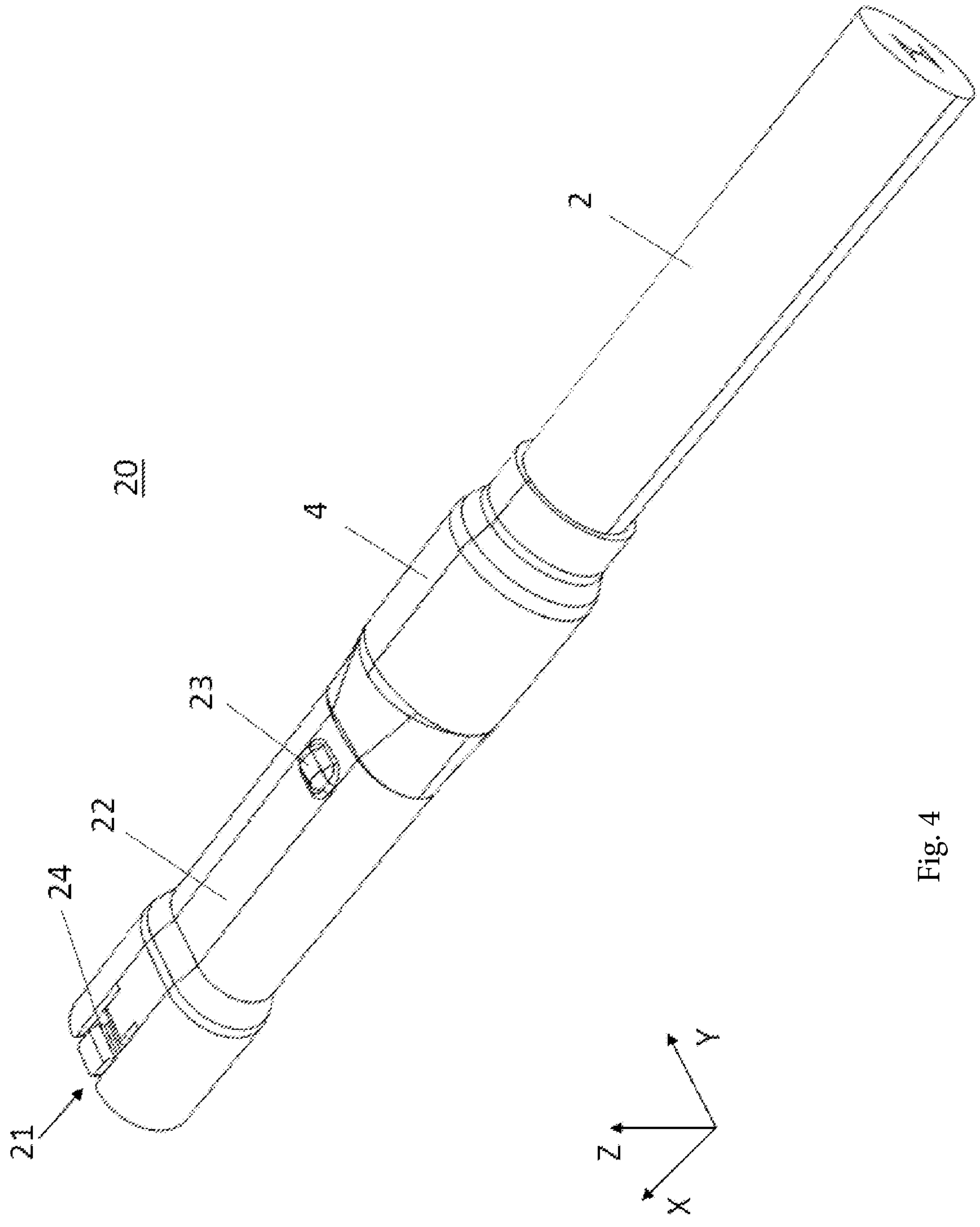
FIG. 4 shows a perspective view of an embodiment of a mating connector.
Figure 5:
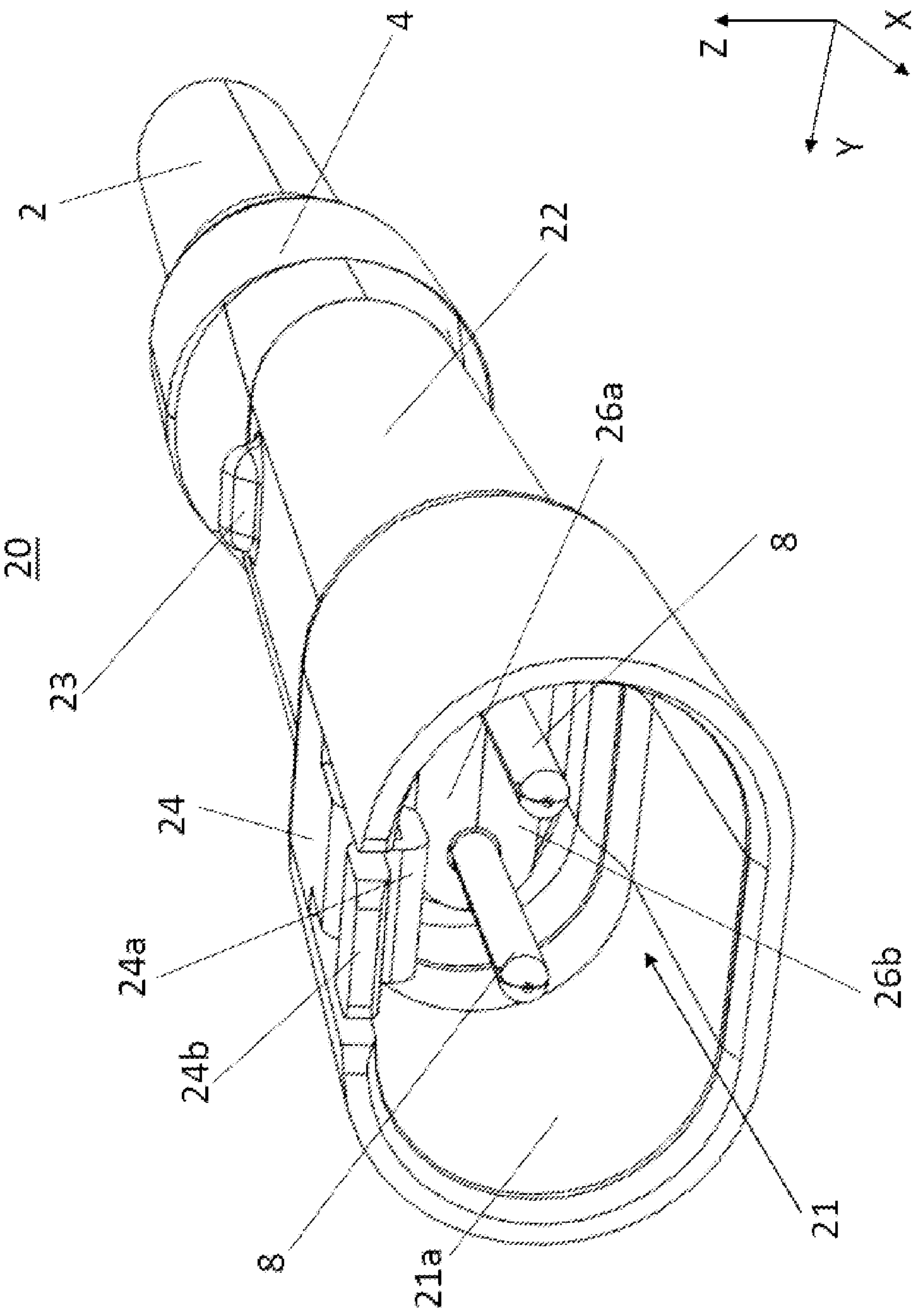
FIG. 5 shows the embodiment of FIG. 4 from a different viewing direction.
Figure 6:
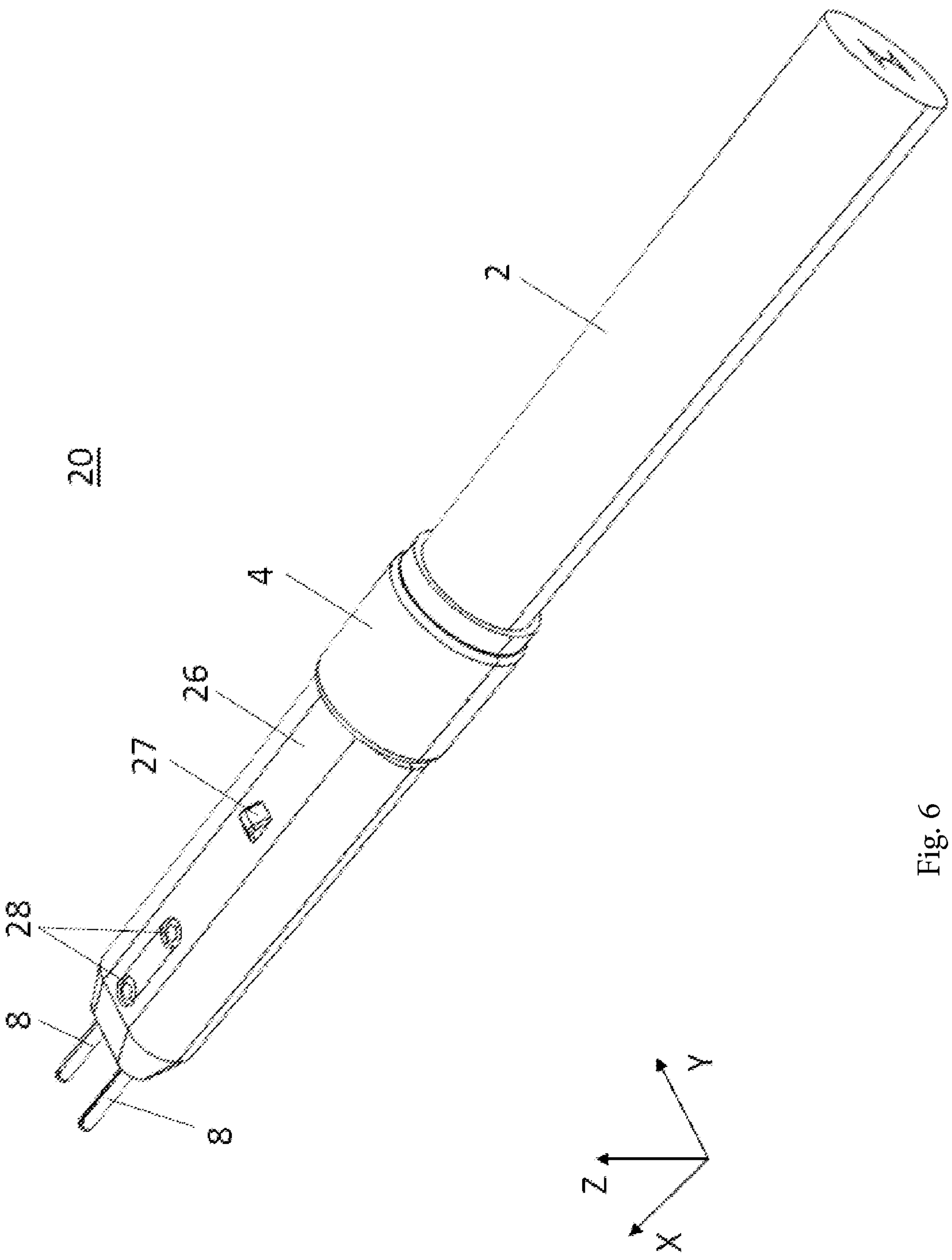
FIG. 6 shows the view of FIG. 4 without the outer conductor.
Figure 7:
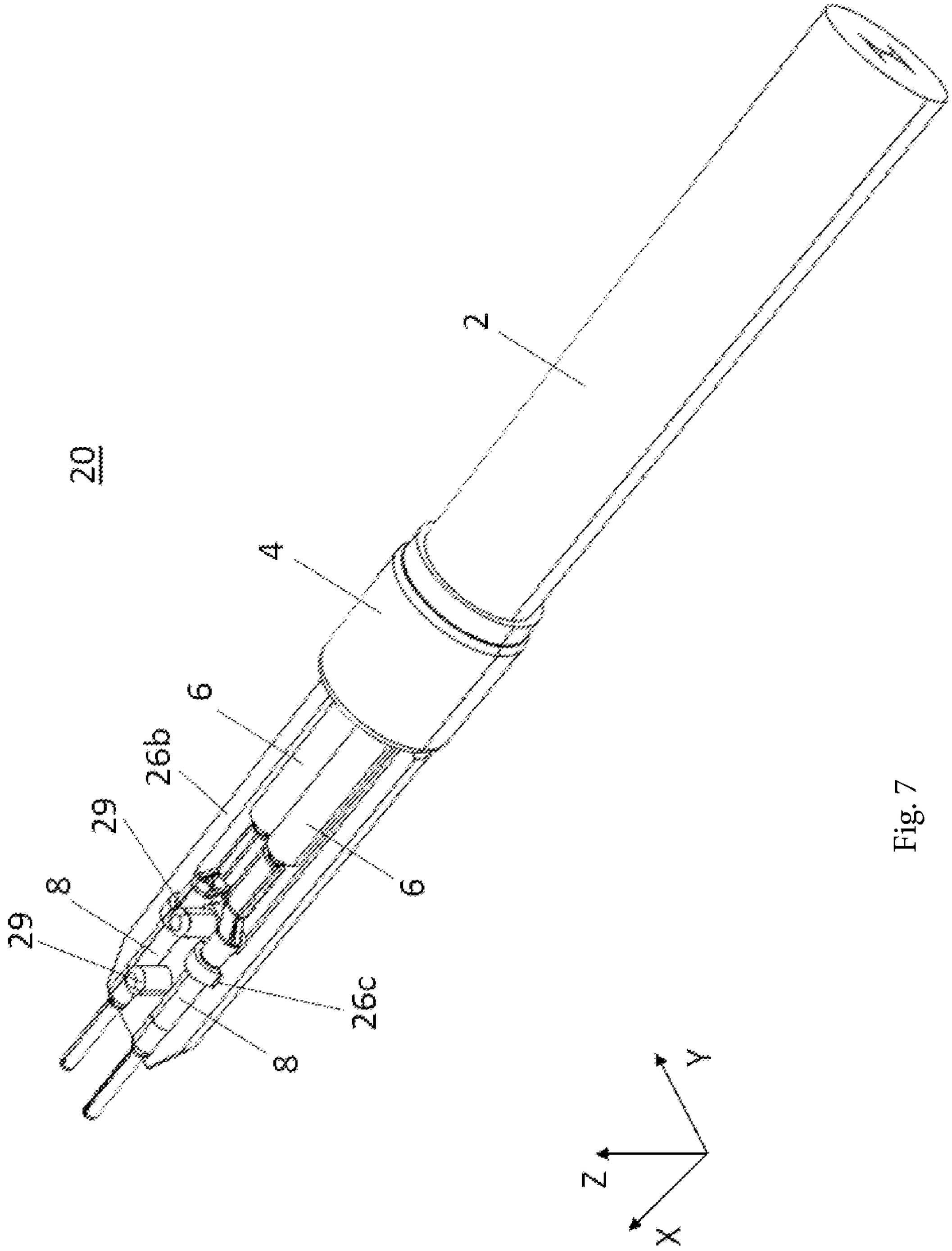
FIG. 7 shows the view of FIG. 4 without the first insulator element.

FIG. 4 and FIG. 5 show an embodiment of a mating connector 20 that can be attached to a connector 10. Mating connector 20 includes the same number of inner conductor contacts 8 as connector 10 (see FIG. 7). The two inner conductor contacts 8 shown are surrounded by an insulator 26 along mating direction X (see FIG. 6). As a result, inner conductor contacts 8 and inner conductors 6 are protected and insulated. Furthermore, insulator 26 is surrounded by an outer conductor contact 22 along mating direction X. Outer conductor contact 22 shields the two depicted inner conductor contacts 8. Outer conductor contact 22 includes at least one plug securing means 24. Via plug securing means 24, mating connector 20 is securable to a corresponding connector 10 via outer conductor contact 22. No coupling via separate housings is needed. In the illustrated embodiment, first plug securing means 24 includes a projection 24*a* that can be interlockingly fitted into a recess 14 on connector 10. Projection 24*a* has, in particular, well-defined edges to achieve a precise and durable interlocking connection with recess 14. In particular, rounded edges are avoided on the projection 24*a* of the present mating connector 20, since they result in large tolerances and disengage more easily (in response to forceful pulling). Furthermore, first plug securing means 24 includes a tab 24*b* for releasing first plug securing means 24 from attachment (see FIG. 5). In the mated state, projection 24*a* can be lifted out of recess 14 of connector 10 by bending tab 24*b* perpendicularly to mating direction X; i.e., in the illustrated embodiment along a third direction Z, whereupon the mated connection between connector 10 and mating connector 20 can be released.

Figure 8:
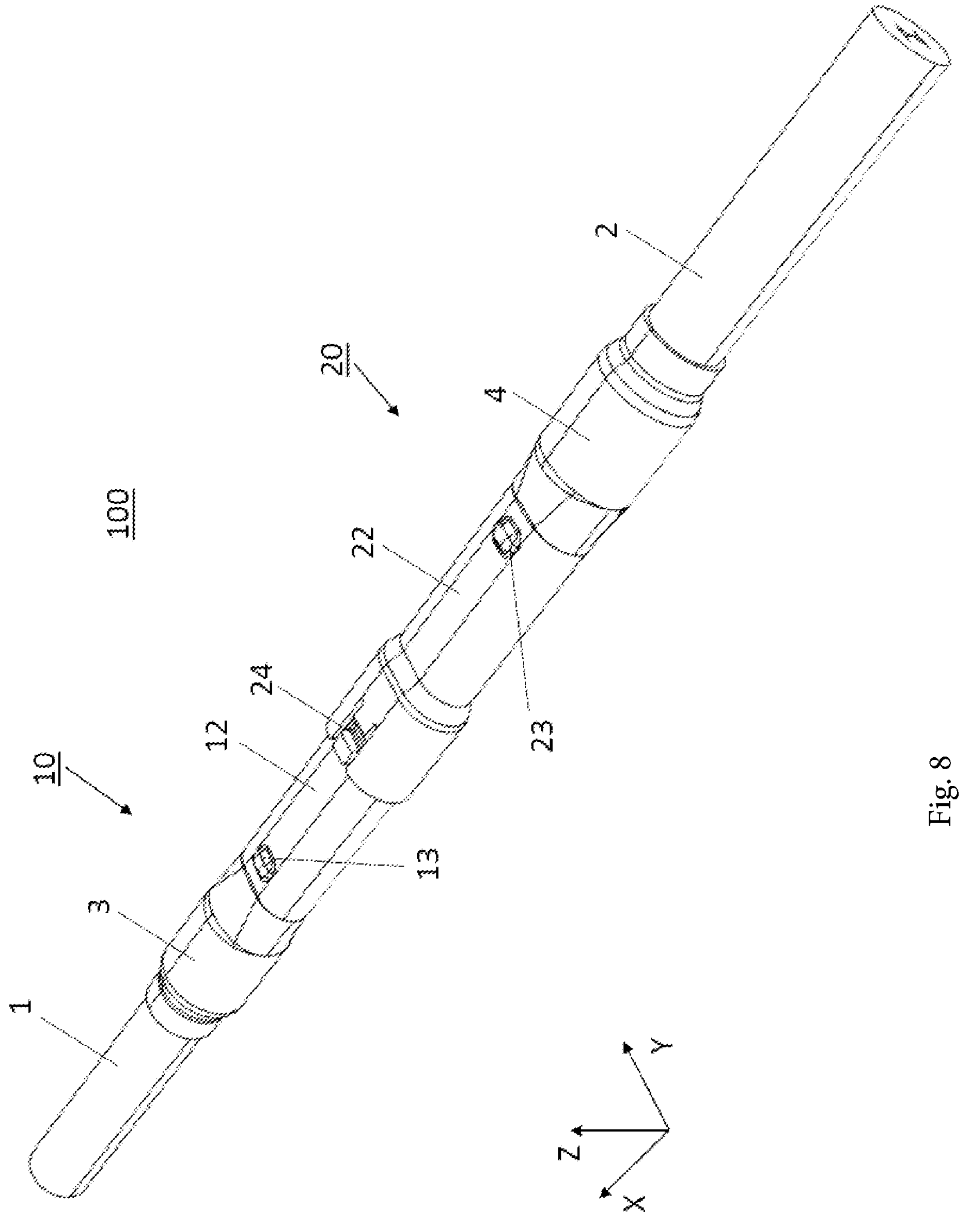
FIG. 8 shows a perspective view of an embodiment of a connector system.
Figure 9:
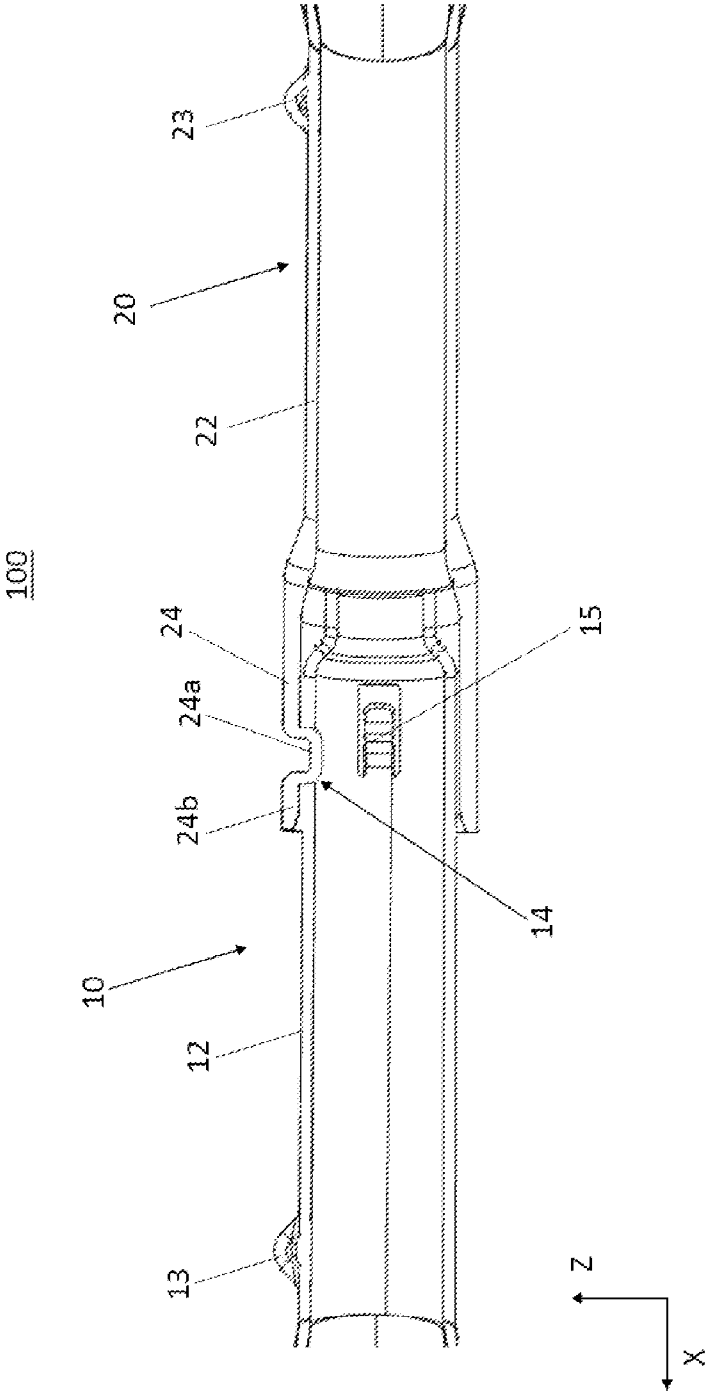
FIG. 9 shows a sectional view of the outer conductors of FIG. 8.

In the mated state, connector 10 and mating connector 20 create a connector system 100 (see FIG. 8). Connector system 100 is in particular secured only via outer conductor contacts 12, 22. To accomplish the attachment, in particular, at least one projection 24*a* on mating connector 20 engages, preferably completely and interlockingly, into a recess 14 on connector 10 (see FIG. 9). The attachment withstands the required pulling forces and ensures a secure mated connection. Pluggable connection 100 may be protected by housings or other encasements.

A step-by-step assembly procedure can be performed as follows: First, at the connector, the at least one inner conductor 5 is mechanically connected to insulator 16. In the embodiments shown, the two insulator elements 16*a*, 16*b* are assembled together, enclosing inner conductors 5 and inner conductor contacts 7. Then, insulator 16 is mechanically connected to outer conductor contact 12. Preferably, outer conductor contact 12 is slid over insulator 16. The tolerances (between the components) are designed to meet the RF design requirements. Optionally and additionally, a mechanical connection may be created between a housing and outer conductor contact 12. The optional housing essentially serves to protect outer conductor contact 12 and has no relevant coupling function between connector 10 and an attached mating connector 20. Mating connector 20 can be assembled in a similar fashion. In the illustrated embodiment, the attachment between connector 10 and a mating connector 20 can be accomplished by latching engagement with the aid of a latching spring 24 disposed on outer conductor contact 22 of mating connector 20. As connector 10 and mating connector 20 are mated, latching spring 24 on mating connector 20 latches into a recess 14 on connector 10 to create a mechanical connection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B. or the entire list of elements A. B and C.

LIST OF REFERENCE CHARACTERS

1 first cable
2 second cable
3 first outer conductor sleeve
4 second outer conductor sleeve
5 first inner conductor
6 second inner conductor
7 first inner conductor contact
8 second inner conductor contact
10 connector
11,21 mating opening
12, 22 outer conductor contacts
13, 23 first inner securing means
14,24 plug securing means
15 second plug securing means
16,26 insulator
16*a*, 26*a* first insulator element
16*b*, 26*b* second insulator element
16*c*, 26*c* recesses
17.27 second inner securing means
18, 28 third inner securing means
18*a* recess
19,29 fourth inner securing means
20 mating connector
21*a* inner wall
24*a* projection
24*b* tab
100 connector system
X mating direction
Y second direction
Z third direction

What is claimed is:

1. A connector configured to transmit high-frequency or radio-frequency signals, wherein the connector is attached to a first cable that includes at least one inner conductor and an outer conductor, the connector comprising:

at least one inner conductor contact surrounded by an insulator along a mating direction, each inner conductor contact being connected to one of the at least one inner conductors of the first cable and being configured to transmit radio-frequency signals and/or power; and an outer conductor contact surrounding the insulator along the mating direction, the outer conductor contact being connected via a first outer conductor sleeve to the outer conductor of the first cable and being configured to shield the at least one inner conductor contact, wherein the outer conductor contact has at least one first plug securing means, so that the connector is securable to a corresponding mating connector via the outer conductor contact.

2. The connector as recited in claim 1, wherein the at least one first plug securing means includes a recess configured to receive a projection on the mating connector such that the projection is interlockingly fitted into the recess.

3. The connector as recited in claim 2, wherein the recess is configured such that an attachment between the connector and the mating connector is effective in the mating direction and in a direction opposite thereto.

4. The connector as recited in claim 1, wherein the outer conductor contact has at least one second plug securing means by which the connector is securable to the mating connector.

5. The connector as recited in claim 4, wherein the at least one second plug securing means includes a clamping element, so that the connector is securable to the mating connector by friction fit.

6. The connector as recited in claim 1, wherein the outer conductor contact includes at least one first inner securing means securing the outer conductor contact to the insulator by an interlocking fit.

7. The connector as recited in claim 1, wherein the insulator includes at least a first and a second insulator element, the first and second insulator elements, in an assembled state, surrounding the at least one inner conductor contact along the mating direction.

8. The connector as recited in claim 7, wherein the first and second insulator elements have recesses so that, in the assembled state, the at least one inner conductor contact is disposed in the insulator with an interlocking fit.

9. The connector as recited in claim 7, wherein the first insulator element includes third inner securing means, and the second insulator element includes fourth inner securing means, the first and second insulator elements being releasably secured together via the third and fourth securing means.

10. A mating connector, configured to transmit high-frequency or radio-frequency signals, wherein the mating connector is attached to a second cable that includes at least one inner conductor, the mating connector comprising:

at least one inner conductor contact surrounded by an insulator along a mating direction; and an outer conductor contact surrounding the insulator along the mating direction, wherein the outer conductor contact has at least one first plug securing means, so that the mating connector is securable to a corresponding connector via the outer conductor contact, the corresponding connector being the connector as recited in claim 1.

11. The mating connector as recited in claim 10, wherein the at least one first plug securing means includes a projection configured to be interlockingly fitted into a recess on the connector.

12. The mating connector as recited in claim 10, wherein the at least one first plug securing means includes a tab for releasing the at least one first plug securing means from attachment.

13. A connector system comprising the connector according to claim 1 and a mating connector secured to the connector via the outer conductor contact.

14. The mating connector as recited in claim 10, wherein the mating connector is configured to circumferentially surround an end of the first outer conductor sleeve opposite the first cable.

* * * * *